(12) United States Patent
Sherman

(10) Patent No.: US 7,929,912 B2
(45) Date of Patent: Apr. 19, 2011

(54) APPARATUS FOR AND METHOD OF BLUETOOTH AND WIMAX COEXISTENCE IN A MOBILE HANDSET

(75) Inventor: Itay Sherman, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 1051 days.

(21) Appl. No.: 11/695,059

(22) Filed: Apr. 2, 2007

(65) Prior Publication Data

US 2007/0232358 A1 Oct. 4, 2007

Related U.S. Application Data

(60) Provisional application No. 60/788,921, filed on Apr. 4, 2006.

(51) Int. Cl.
H04B 7/00 (2006.01)
(52) U.S. Cl. .................................. 455/41.2; 370/228
(58) Field of Classification Search .............. 455/41.1, 455/41.2, 556.1, 560, 1; 370/328, 338
See application file for complete search history.

(56) References Cited

U.S. PATENT DOCUMENTS

| 2001/0010689 | A1* | 8/2001 | Awater et al. ................ 370/344 |
| 2002/0061031 | A1* | 5/2002 | Sugar et al. .................. 370/466 |
| 2007/0135162 | A1* | 6/2007 | Banerjea et al. ........... 455/556.1 |
| 2007/0224936 | A1* | 9/2007 | Desai .......................... 455/41.2 |
| 2009/0207826 | A1* | 8/2009 | Bitran et al. ................. 370/338 |
| 2009/0213827 | A1* | 8/2009 | Bitran et al. ................. 370/338 |

OTHER PUBLICATIONS

"Wimax Coexistence Protocol", MARVEL, Revision 0.03, Dec. 9, 2005.*

* cited by examiner

Primary Examiner — Nay Maung
Assistant Examiner — Angelica M Perez
(74) Attorney, Agent, or Firm — Ronald O. Neerings; Wade James Brady, III; Frederick J. Telecky, Jr.

(57) ABSTRACT

A novel and useful apparatus for and method of Bluetooth and WiMAX coexistence. The invention provides a system approach to achieving coexistence between Bluetooth and WiMAX transceivers collocated in a mobile terminal. The coexistence mechanism of the present invention is particularly suited to operation of WiMAX in the 2.3 GHz and 2.5 GHz frequency bands. In operation, the coexistence mechanism of the present invention utilizes multiple algorithms depending on the capabilities of the Bluetooth peer and the power save support level of the WiMAX base station. In the example embodiment presented herein, the coexistence mechanism is implemented in the MAC layer of the Bluetooth and WiMAX radio modules.

6 Claims, 11 Drawing Sheets

APPARATUS FOR AND METHOD OF BLUETOOTH AND WIMAX COEXISTENCE IN A MOBILE HANDSET

REFERENCE TO PRIORITY APPLICATION

This application claims priority to U.S. Provisional Application Ser. No. 60/788,921, filed Apr. 4, 2006, entitled "Attached BT headset to mobile handset terminal", incorporated herein by reference in its entirety.

FIELD OF THE INVENTION

The present invention relates to the field of data communications and more particularly relates to an apparatus for and method of enabling Bluetooth and WiMAX radios to coexist in the same mobile handset terminal.

BACKGROUND OF THE INVENTION

Currently there are numerous consumer electronics communications devices such as portable multimedia players, add-ons for portable multimedia players, cellular telephones, personal digital assistants (PDAs), etc. that support a primary communications connection in addition to one or more secondary communications connections. Considering communication devices such as cellular phones, for example, an increasing number of cellular phones today support both the basic primary cellular communications connection as well as support one or more secondary connections such as Bluetooth and Wireless Local Area Network (WLAN) which permit direct connection between cellular phones. In addition to cellular, WiMAX enabled mobile devices also incorporate one or more secondary communications connections. Other short distance wireless technologies such as ultra wideband (UWB) and others are to be incorporated into mobile devices in the next several years.

Bluetooth is an industrial specification for wireless personal area networks (PAN). Bluetooth provides a way to connect and exchange information between devices such as mobile phones, printers, PCs, laptops, and other digital equipment, over a secure, globally unlicensed short-range radio frequency (RF).

Bluetooth is a radio standard and communications protocol primarily designed for low power consumption, with a short range based on low-cost transceiver integrated circuits (ICs) in each device. Bluetooth networks enable these devices to communicate with each other when they are in range.

Bluetooth capability is increasingly built-in to many new products such as phones, printers, modems and headsets. Bluetooth is appropriate for situations when two or more devices are in proximity to each other and do not require high bandwidth. Bluetooth is most commonly used with phones and hand-held computing devices, either using a Bluetooth headset or transferring files from phones/PDAs to computers.

Bluetooth also simplified the discovery and setup of services, in contrast to WLAN which is more analogous to a traditional Ethernet network and requires configuration to set up shared resources, transmit files, set up audio links (e.g., headsets and hands-free devices), whereas Bluetooth devices advertise all the services they provide; thus making the service more accessible, without the need to worry about network addresses, permissions, etc.

The Worldwide Interoperability for Microwave Access (WiMAX) is defined by the WiMAX Forum and is embodied in the IEEE 802.16 standard, officially known as Wireless Metropolitan Area Network (WMAN). Many companies are currently considering using WiMAX for "last mile" connectivity at high data rates. In areas that do not have pre-existing physical cable or telephone networks, WiMAX is a viable alternative for broadband access.

WiMAX is a long range system that uses licensed spectrum to deliver a point-to-point connection to the Internet from an ISP to an end user. Different 802.16 standards provide different types of access, from mobile (i.e. access via a cell phone) to fixed which is an alternative to wired access, where the end user's wireless termination point is fixed in location.

WiMAX is a term coined to describe standard, interoperable implementations of IEEE 802.16 wireless networks. The 802.16 MAC uses a scheduling algorithm for which the subscriber station need compete once (for initial entry into the network). After that it is allocated an access slot by the base station. The time slot can enlarge and contract, but remains assigned to the subscriber station which means that other subscribers cannot use it. The 802.16 scheduling algorithm is stable under overload and over-subscription. It is also more bandwidth efficient. In addition, the scheduling algorithm allows the base station to control QoS parameters by balancing the time-slot assignments among the application needs of the subscriber stations.

Regarding the PHY layer, the IEEE 802.16e standard uses scalable orthogonal frequency-division multiplexing (OFDM) and also provides for Multiple Antenna Support through multiple-input, multiple-output. This brings potential benefits in terms of coverage, self installation, power consumption, frequency re-use and bandwidth efficiency. The 802.16e standard also adds a capability for full mobility support.

Regarding spectrum allocation, the 802.16 specification applies across a wide swath of the RF spectrum. There is no uniform global licensed spectrum for WiMAX. In the United States, the biggest segment available is at approximately 2.5 GHz, and is already assigned to carriers (Sprint Nextel and Clearwire). Elsewhere in the world, the most likely bands used will be around 3.5 GHz, 2.3/2.5 GHz, or 5 GHz, with 2.3/2.5 GHz probably being most important in Asia. In addition, several companies have announced plans to utilize the WiMAX standard in the 1.7/2.1 GHz spectrum band recently auctioned by the FCC, for deployment of Advanced Wireless Services (AWS).

The actual radio bandwidth of spectrum allocations is also likely to vary. Typical allocations are likely to provide channels of 5 MHz or 7 MHz. In principle, the larger the bandwidth allocation of the spectrum, the higher the bandwidth that WiMAX can support for user traffic.

The deployment of WiMAX in the United States will be in the 2.5 GHz band. Bluetooth, however, uses the 2.4 GHz band for communications. A problem arises, however, in that the small frequency separation between these two bands does not allow for any meaningful filtering. Simple RF filtering and device blocking performance is not sufficient to provide the required conditions to allow simultaneous operation of these two technologies.

A network diagram illustrating an example prior art network incorporating Bluetooth and WiMAX radios is shown in FIG. 1. The example wireless scenario, generally referenced 10, comprises two mobile devices, namely mobile device A 12 and mobile device B 16, a WiMAX base station 14 and Bluetooth headset 26. Mobile device A comprises a Bluetooth radio 18 as well as a WiMAX radio 20. Similarly, mobile device B comprises a Bluetooth radio 22 as well as a WiMAX radio 24. It is possible that in operation the Bluetooth and WiMAX devices communicate at the same time. Thus, the Bluetooth radio 18 in mobile device A may communicate either with the Bluetooth radio 22 in mobile device B or the Bluetooth headset 26. At the same time, the WiMAX radios 20, 24 communicate with the WiMAX base station 14.

Antenna isolation between the two radios is not likely to provide a good solution. Assuming separate antennas are used, antenna isolation is limited to approximately 15 dB. If both Bluetooth and WiMAX are included on the same handset or other device, their transmissions in effect create blocking and/or degraded sensitivity for the other transceivers receive chain while the other is transmitting. WiMAX transmission is +24 dBm with peaks of +31 dBm. Considering an antenna isolation of 15 dBm, this yields +9 dBm to +16 dBm on the Bluetooth terminal. Such a high level of input power could damage the Bluetooth transceiver.

It is thus desirable to have a mechanism that is capable of enabling a Bluetooth and WiMAX radio to coexist in the same mobile device. The coexistence mechanism should not cause performance degradations in either the Bluetooth or WiMAX radios and should have a minimal impact on cost and required resources in its implementation.

SUMMARY OF THE INVENTION

The present invention is a novel and useful apparatus for and method of Bluetooth and WiMAX coexistence. The invention provides a system approach to achieving coexistence between Bluetooth and WiMAX transceivers collocated in a mobile terminal. The coexistence mechanism of the present invention is particularly suited to operation of WiMAX in the 2.3 GHz and 2.5 GHz frequency bands where the performance of simple RF filtering and device blocking are not sufficient to allow simultaneous operation of the two technologies. This occurs when the receive chain of one of the transceivers is blocked or subject to degraded sensitivity while the other transceiver is transmitting.

In operation, the coexistence mechanism of the present invention utilizes multiple algorithms depending on the capabilities of the Bluetooth peer and the power save support level of the WiMAX base station. In the example embodiment presented herein, the coexistence mechanism is implemented in the MAC layer of the Bluetooth and WiMAX radio modules.

The Bluetooth transceiver time base is synchronized to WiMAX frames. Bluetooth ACL transmissions are pre-empted whenever the WiMAX radio is operating in either receive or transmit. When a Bluetooth eSCO link is set up, the WiMAX radio switches to power save mode and the listen and sleep periods are adjusted accordingly. Bluetooth transmission slots are initially scheduled such that they do not overlap WiMAX listen windows. Synchronization between the Bluetooth and WiMAX radio modules is maintained by applying corrections to the Bluetooth clock based on the start of frames indication signals generated by the WiMAX transceiver.

Although the Bluetooth/WiMAX coexistence mechanism of the present invention can be incorporated in numerous types of communication devices such a multimedia player, cellular phone, PDA, etc., it is described in the context of a mobile device. It is appreciated, however, that the invention is not limited to the example applications presented, whereas one skilled in the art can apply the principles of the invention to other communication systems as well without departing from the scope of the invention.

The Bluetooth/WiMAX coexistence mechanism has several advantages including the following: (1) allows for collocated operation of a Bluetooth transceiver at 2.3 GHz and a WiMAX transceiver at 2.5 GHz; (2) the mechanism of the present invention is operative to support both data and voice traffic operations on both Bluetooth and WiMAX transceivers; and (3) use of the mechanism of the present invention does not degrade the performance of WiMAX nor waste operator bandwidth.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the present invention, a method of coexistence between a Bluetooth transceiver and a WiMAX transceiver collocated in a mobile device, the method comprising the steps of generating a signal indicating active reception or transmission of the WiMAX transceiver and receiving the signal by the Bluetooth transceiver and blocking transmit and receive activity in the Bluetooth transceiver in response thereto.

There is also provided in accordance with the present invention, a method of coexistence between a Bluetooth transceiver and a WiMAX transceiver collocated in a mobile device, the method comprising the steps of synchronizing the Bluetooth transceiver to WiMAX frames, WiMAX switching to power save mode in response to Bluetooth eSCO link setup, configuring WiMAX listen period and sleep window as a multiple of a basic eSCO period, the Bluetooth transceiver attempting to establish eSCO periods as a multiple of WiMAX frame size and if base station capabilities do not permit power save and WiMAX frame size, selecting a listen period and sleep window such that at least one retransmission attempt for each Bluetooth eSCO burst does not overlap the WiMAX listen window.

There is further provided in accordance with the present invention, a method of coexistence between a Bluetooth transceiver and a WiMAX transceiver collocated in a mobile device, the method comprising the steps of blocking the Bluetooth transceiver when WiMAX transmit/receive activity is detected and permitting an exception for Bluetooth last retry latency sensitive packet transmission which takes precedence over WiMAX transmit/receive activity.

There is also provided in accordance with the present invention, a method of coexistence between a Bluetooth transceiver and a WiMAX transceiver collocated in a mobile device, the method comprising the steps of detecting intent of the Bluetooth transceiver to transmit latency sensitive services traffic and if the Bluetooth transceiver does not support transmission retries, blocking WiMAX transceiver transmit/receive activity during transmission of latency sensitive services traffic by the Bluetooth transceiver.

There is further provided in accordance with the present invention, a mobile communications device comprising a Bluetooth transceiver and associated Bluetooth media access control (MAC), a WiMAX transceiver and associated WiMAX MAC, coexistence means coupled to the Bluetooth transceiver and the WiMAX transceiver, the coexistence means operative to, synchronize the time base of the Bluetooth transceiver to WiMAX frames, block Bluetooth ACL transmissions during WiMAX transmit/receive activity, switch the WiMAX transceiver to power save mode in response to Bluetooth SCO link setup and to select a listen period and sleep window to be a multiple a basic SCO period, schedule Bluetooth SCO slots such that they do not overlap with WiMAX listen windows and a processor operative to send and receive data to and from the Bluetooth transceiver and the WiMAX transceiver.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
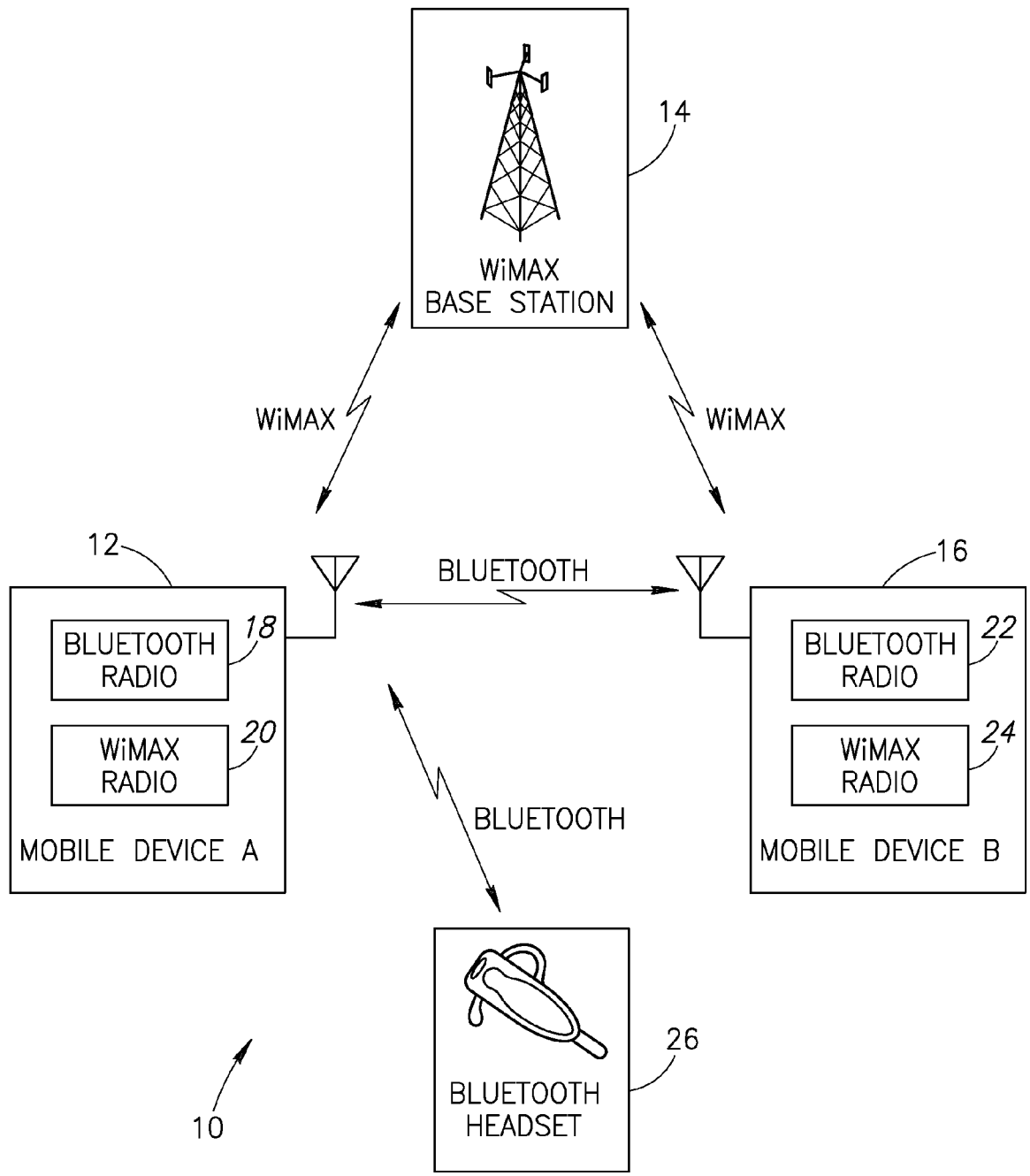
FIG. 1 is a network diagram illustrating an example prior art network incorporating Bluetooth and WiMAX radios.

The following notation is used throughout this document.

| Term | Definition |
| --- | --- |
| AC | Alternating Current |
| ACL | Asynchronous Connectionless Link |
| ADC | Analog to Digital Converter |
| ASIC | Application Specific Integrated Circuit |
| AVI | Audio Video Interleave |
| AWS | Advanced Wireless Services |
| BMP | Windows Bitmap |
| CPU | Central Processing Unit |
| DAC | Digital to Analog Converter |
| DC | Direct Current |
| DSP | Digital Signal Processor |
| EDR | Enhanced Data Rate |
| EEPROM | Electrically Erasable Programmable Read Only Memory |
| EPROM | Erasable Programmable Read Only Memory |
| eSCO | Extended Synchronous Connection-Oriented |
| FCC | Federal Communications Commission |
| FM | Frequency Modulation |
| FPGA | Field Programmable Gate Array |

-continued

| Term | Definition |
| --- | --- |
| HDL | Hardware Description Language |
| HFP | Hands Free Protocol |
| I/F | Interface |
| IC | Integrated Circuit |
| IEEE | Institute of Electrical and Electronics Engineers |
| JPG | Joint Photographic Experts Group |
| LAN | Local Area Network |
| MAC | Media Access Control |
| MAP | Media Access Protocol |
| MP3 | MPEG-1 Audio Layer 3 |
| MPG | Moving Picture Experts Group |
| OFDM | Orthogonal Frequency Division Multiplexing |
| PAN | Personal Area Network |
| PC | Personal Computer |
| PCI | Personal Computer Interconnect |
| PDA | Portable Digital Assistant |
| QoS | Quality of Service |
| RAM | Random Access Memory |
| RF | Radio Frequency |
| ROM | Read Only Memory |
| SCO | Synchronous Connection-Oriented |
| SIM | Subscriber Identity Module |
| TDD | Time Division Duplex |
| UGS | Unsolicited Grant Services |
| USB | Universal Serial Bus |
| UWB | Ultra Wideband |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMAN | Wireless Metropolitan Area Network |
| WMV | Windows Media Video |

Detailed Description of the Invention

The present invention is a novel and useful apparatus for and method of Bluetooth and WiMAX coexistence. The invention provides a system approach to achieving coexistence between Bluetooth and WiMAX transceivers collocated in a mobile terminal. The coexistence mechanism of the present invention is particularly suited to operation of WiMAX in the 2.3 GHz and 2.5 GHz frequency bands where the performance of simple RF filtering and device blocking are not sufficient to allow simultaneous operation of the two technologies. This occurs when the receive chain of one of the transceivers is blocked or subject to degraded sensitivity while the other transceiver is transmitting.

Although the Bluetooth/WiMAX coexistence mechanism of the present invention can be incorporated in numerous types of communication devices such a multimedia player, cellular phone, PDA, etc., it is described in the context of a mobile device. It is appreciated, however, that the invention is not limited to the example applications presented, whereas one skilled in the art can apply the principles of the invention to other communication systems as well without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10 Base-T, 100 Base-T or 1000 Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA System

Figure 2:
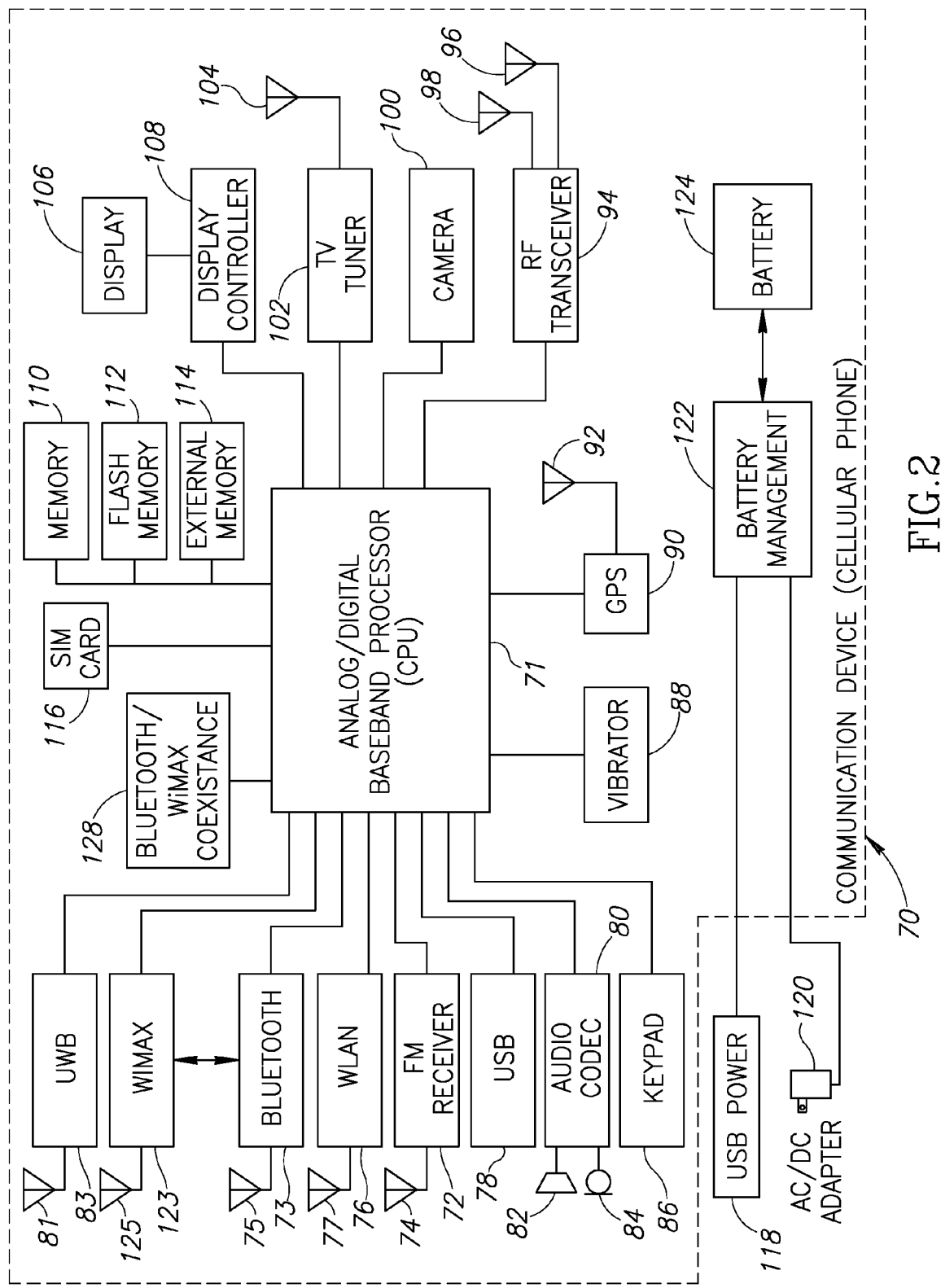
FIG. 2 is a block diagram illustrating an example communication device in more detail incorporating the Bluetooth/WiMAX coexistence mechanism of the present invention.

A block diagram illustrating an example communication device in more detail incorporating the Bluetooth/WiMAX coexistence mechanism of the present invention is shown in FIG. 2. The communication device may comprise any suitable wired or wireless device such as multimedia player, mobile device, cellular phone, PDA, Bluetooth device, etc. For illustration purposes only, the communication device is shown as a cellular phone. Note that this example is not intended to limit the scope of the invention as the Bluetooth/WiMAX coexistence mechanism of the present invention can be implemented in a wide variety of communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver and associated antenna 92.

A USB interface connection 78 provides a serial link to a user's PC or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. A Bluetooth radio and interface 73 and antenna 75 provide Bluetooth wireless connectivity when within the range of a Bluetooth wireless network. The communication device 70 may also comprise an Ultra Wideband (UWB) radio and interface 83 and antenna 81. Further, the communication device 70 may also comprise a WiMAX radio and interface 123 and antenna 125. SIM card 116 provides the interface to a user's SIM card for storing user data such as address book entries, etc.

The cellular phone also comprises a Bluetooth/WiMAX coexistence block 128 adapted to implement the Bluetooth/WiMAX coexistence mechanism of the present invention as described in more detail infra. In operation, the Bluetooth/WiMAX coexistence block 128 may be implemented as hardware, software executed as a task on the baseband processor 71 or a combination of hardware and software. Implemented as a software task, the program code operative to implement the Bluetooth/WiMAX coexistence mechanism of the present invention is stored in one or more memories 110, 112 or 114.

Portable power is provided by the battery 124 coupled to battery management circuitry 122. External power is provided via USB power 118 or an AC/DC adapter 120 connected to the battery management circuitry which is operative to manage the charging and discharging of the battery 124.

Example Mobile Device with Coexistence Mechanism

Figure 3:
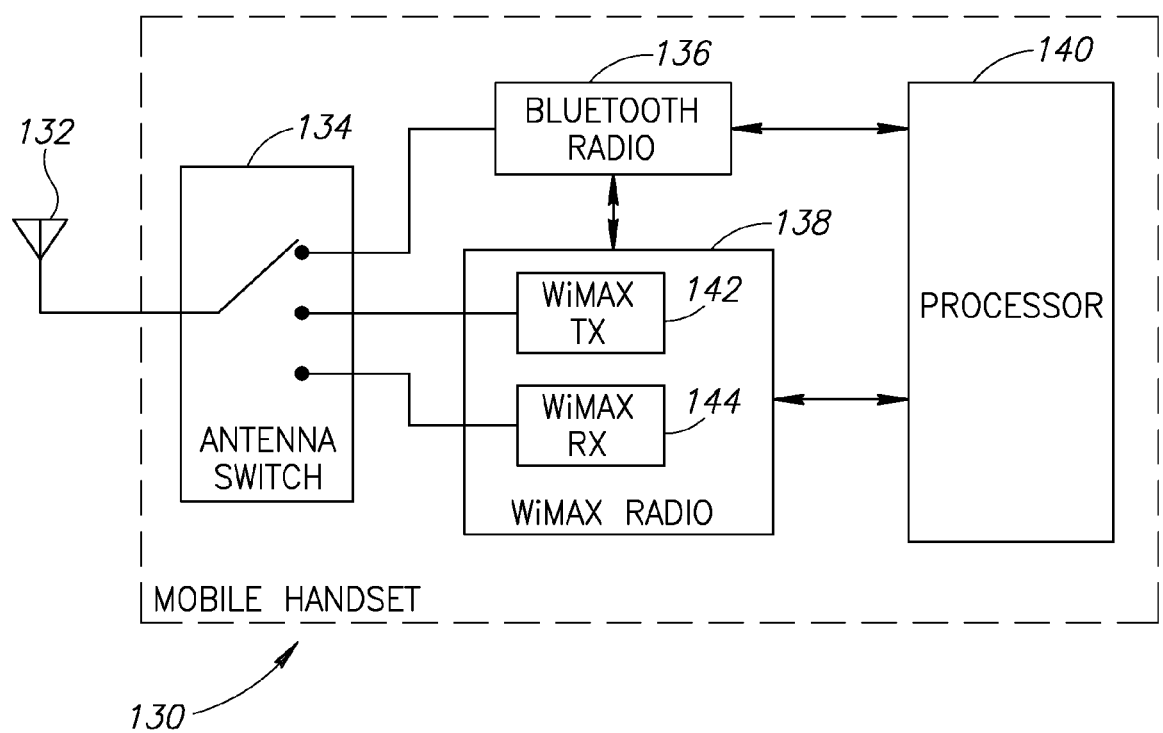
FIG. 3 is a simplified block diagram illustrating an example mobile handset incorporating the Bluetooth/WiMAX coexistence mechanism of the present invention.

A simplified block diagram illustrating an example mobile handset incorporating the Bluetooth/WiMAX coexistence mechanism of the present invention is shown in FIG. 3. The example circuit, generally referenced 130, comprises an antenna 132, 3-way antenna switch 134, Bluetooth radio 136, WiMAX radio 138 incorporating a WiMAX transmitter 142 and WiMAX receiver 144, and a controller (processor) 140. In accordance with the invention, the Bluetooth and WiMAX radios communicate with each other control information to prevent the transmissions from one radio affecting the other.

Example Bluetooth Module Incorporating the Coexistence Mechanism

Figure 4:
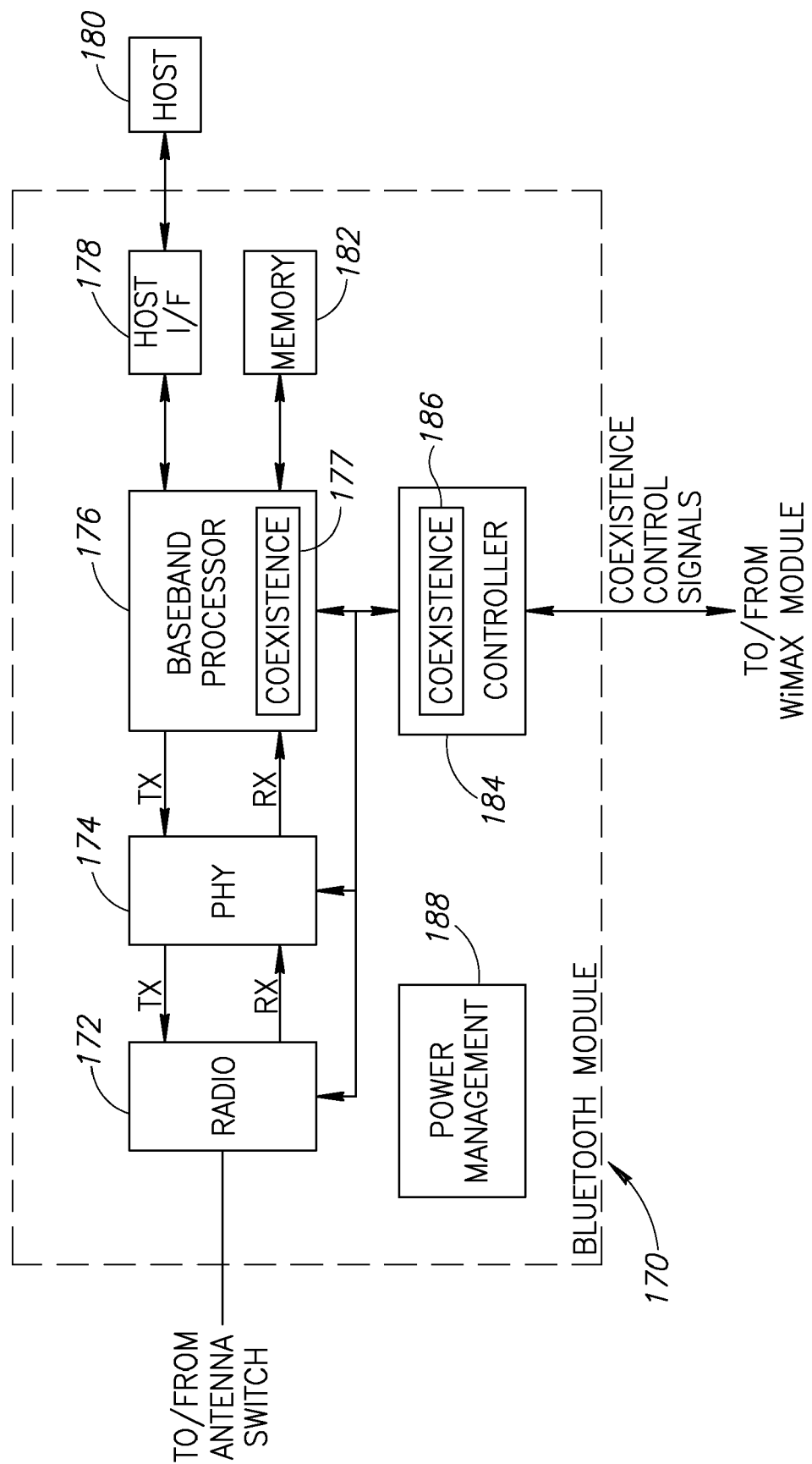
FIG. 4 is a block diagram illustrating an example Bluetooth module adapted for use with the Bluetooth/WiMAX coexistence mechanism of the present invention.

A block diagram illustrating an example Bluetooth module adapted for use with the Bluetooth/WiMAX coexistence mechanism of the present invention is shown in FIG. 4. The Bluetooth module (i.e. headset, cell phone, etc.), generally referenced 170, comprises host interface (I/F) 178 in communication with a host device 180, baseband processor/MAC 176, memory 182, PHY circuit 174, Bluetooth radio 172, controller 184 and power management module 188. The radio circuitry 172, coupled to the antenna switch 134 (FIG. 3), comprises the RF switch, bandpass filter, RF front end circuitry, bandpass filter, etc. (not shown). The PHY circuit 174 comprises I and Q signal analog to digital converters (ADCs) and I and Q signal digital to analog converters (DACs) (not shown). The memory 182 comprises any memory devices such as EEPROM, static RAM, FLASH memory, etc. necessary for operation of the processor/MAC. Note that in one embodiment, the mechanism of the invention is implemented as firmware/software that resides in memory 182 and executed on the baseband processor or other controller device or is implemented in hardware in the MAC layer in the processor 176 (coexistence block 177). Alternatively, the mechanism may be implemented in the host or a combination of the host and baseband processor or may be implemented in the controller 184 (coexistence block 186).

The RF front end circuit with the radio functions to filter and amplify RF signals and perform RF to IF conversion to generate I and Q data signals for the ADCs and DACs in the PHY. The baseband processor functions to modulate and demodulate I and Q data, perform carrier sensing, transmission and receiving of frames. The medium access controller (MAC) functions to control the communications (i.e. access) between the host device and applications. The power management circuit 188 is adapted to receive power via a wall adapter, battery and/or power via the host interface 180. The host interface may comprise PCI, CardBus or USB interfaces.

Example WiMAX Module Incorporating the Coexistence Mechanism

Figure 5:
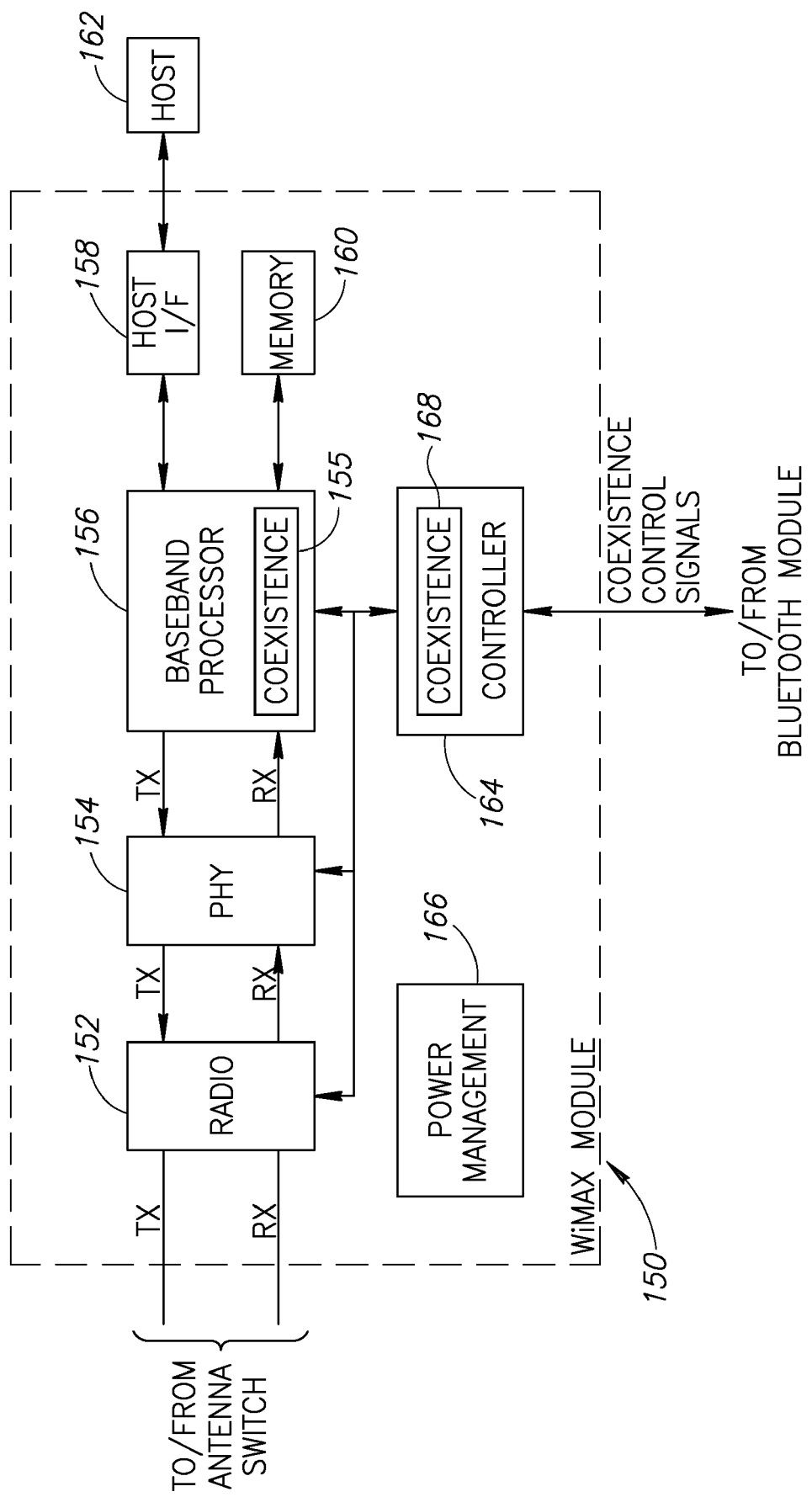
FIG. 5 is a block diagram illustrating an example WiMAX module adapted for use with the Bluetooth/WiMAX coexistence mechanism of the present invention.

A block diagram illustrating an example WiMAX module adapted for use with the Bluetooth/WiMAX coexistence mechanism of the present invention is shown in FIG. 5. The WiMAX module (i.e. cell phone, PDA, etc.), generally referenced 150, comprises host interface (I/F) 158 in communication with a host device 162, baseband processor/MAC 156, memory 160, PHY circuit 154, WiMAX radio 152, controller 164 and power management module 166. The radio circuitry 152, coupled to the antenna switch 134 (FIG. 3), comprises the RF switch, band pass filter, RF front end circuitry, band pass filter, etc. (not shown). The PHY circuit 154 comprises I and Q signal analog to digital converters (ADCs) and I and Q signal digital to analog converters (DACs) (not shown). The memory 160 comprises any memory devices such as EEPROM, static RAM, FLASH memory, etc. necessary for operation of the processor/MAC. Note that in one embodiment, the mechanism of the invention is implemented as firmware/software that resides in memory 160 and executed on the baseband processor or other controller device or is implemented in hardware in the MAC layer in the processor 156 (coexistence block 155). Alternatively, the mechanism may be implemented in the host or a combination of the host and baseband processor or may be implemented in the controller 164 (coexistence block 168).

The RF front end circuit with the radio functions to filter and amplify RF signals and perform RF to IF conversion to generate I and Q data signals for the ADCs and DACs in the PHY. The baseband processor functions to modulate and demodulate I and Q data, perform carrier sensing, transmission and receiving of frames. The medium access controller (MAC) functions to control the communications (i.e. access) between the host device and applications. The power management circuit 166 is adapted to receive power via a wall adapter, battery and/or power via the host interface 162. The host interface may comprise PCI, CardBus or USB interfaces.

Coexistence Control

Figure 6:
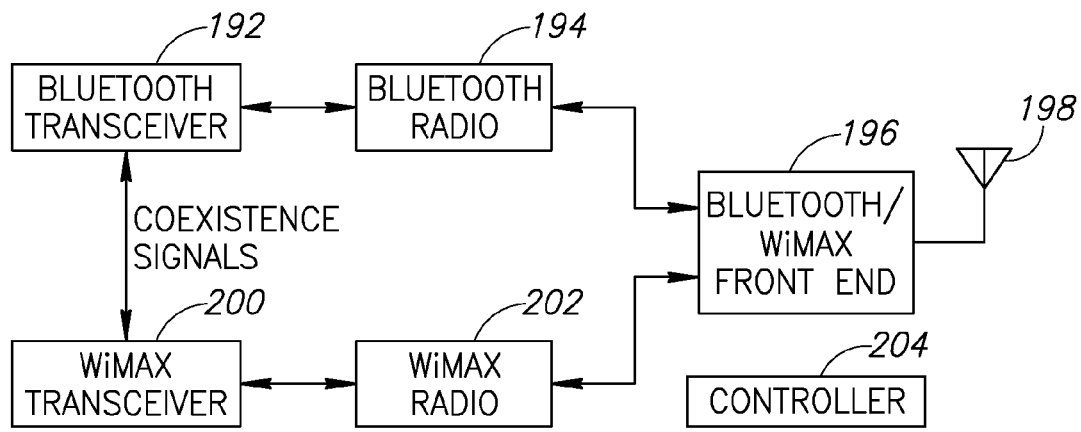
FIG. 6 is a simplified block diagram illustrating the communication of control signals between Bluetooth and WiMAX radios.

A simplified block diagram illustrating the communication of control signals between Bluetooth and WiMAX radios is shown in FIG. 6. The example circuit, generally referenced 190, comprises a Bluetooth transceiver 192, Bluetooth radio 194, WiMAX transceiver 200, WiMAX radio 202, Bluetooth/WiMAX front end circuit 196, controller 204 and antenna 198. In accordance with the invention, Bluetooth and WiMAX transceivers exchange control information to achieve coexistence between the Bluetooth and WiMAX radios. The coexistence control mechanism is described in more detail hereinbelow preceded by a brief description of WiMAX and Bluetooth technologies and environments.

WiMAX Environment

WiMAX transmissions and receptions are normally scheduled by the base station. The transmissions are organized in frames having a fixed duration. Each frame is split into a downstream portion and an upstream portion. The first part of the downstream transmission of a frame is a Media Access Protocol (MAP) message that describes the specific slots assigned to the mobile device for reception and transmission within this frame. In addition, WiMAX supports power save operation for the mobile device. A mobile device operating in power save mode goes through periods of activity and inactivity. The duration of these time periods are in the granularity of the duration of frame length.

The mobile WiMAX technology is based on the IEEE 802.16e standard. The standard is very broad in terms of implementation options, but typically only a subset of its capabilities are deployed. The WiMAX forum has defined the profiles of usage for the 802.16e standard and the analysis herein is based on these profiles. The most important items in the context of this analysis are the WiMAX Time Division Duplex (TDD) operation and the frame size selection (5 msec). The analysis presented herein assumes the mobile station is connected to the WiMAX base station and used to deliver both data and voice services using all relevant WiMAX services such as Unsolicited Grant Services (UGS), non Real-time Polling (nRTP), etc.

The WiMAX specification includes support for mobile station power save operation which the present invention makes use of. The specification includes three different types of power save schemes, but the WiMAX profiles only mandate the support of Type 1. Several of the algorithms presented herein rely on the support of Power Save Type 3 by the Mobile Station and Base Station. Mobile stations and base stations without this support may not be able to implement one or more coexistence schemes of the present invention. Throughout this document, reference is made to the following two options (or conditions):

A1: Only the mandatory Power Save Type 1 mode is supported;

A2: Periodic Power Save Type 3 mode is supported;

Note that the operation of the coexistence schemes of the invention are presented for both these options.

The WiMAX system is a managed network with limited bandwidth. The coexistence mechanism of the invention attempts to avoid effecting the utilization of the WiMAX network. In other words, the coexistence mechanism allows the WiMAX transceiver to receive all slots assigned to it and transmit on all slot opportunities granted to it. It is noted that conflicts may arise in some scenarios between the aim of providing some required Bluetooth services and enabling full utilization of the WiMAX network. The mechanism of the invention attempts to maintain a "zero waste" policy and in the few cases where this is not possible, provides a tradeoff between WiMAX bandwidth waste and degradation of Bluetooth service.

Bluetooth Environment

Bluetooth transmissions can be split into one or two categories: Asynchronous Connectionless Link (ACL) and Synchronous Connection-Oriented Link (SCO)/extended SCO (eSCO) transmissions. ACL transmissions are used to send asynchronous data with retries available on transmission. ACL data transmissions are used for data transfer and newer audio profiles (e.g., stereo listening to MP3 music, etc.) ACL data may be rescheduled for transmission or completely blocked since it uses retires and can thus tolerate interruptions in transmission.

The Bluetooth transceiver is used to support different Bluetooth profiles and traffic types. The traffic can generally be categorized into one or two types as follows:

B1: ACL traffic that is used to carry data services such as file transfer, printing, modem data, etc. as well as unidirectional high quality audio (i.e. A2DP profile). ACL traffic has no tight scheduling requirement as compared to the WiMAX frame size and can tolerate latencies of at least 10 msec. Since, the ACL traffic uses a retry mechanism it is not vulnerable to packet loss.

B2: SCO/eSCO traffic that is used to carry latency sensitive services such as voice. The SCO traffic has no retries and is therefore extremely sensitive to packet loss. Although eSCO traffic has the option to use retries, the number of retries is usually very limited and therefore it is partially sensitive to packet loss.

SCO/eSCO transmissions use fixed synchronous patterns to send data typically with no retires or a limited number of retries. SCO/eSCO data is used primarily for voice such as in Bluetooth enabled voice headsets. Once an SCO/eSCO connection is established, the schedule of transmission should be maintained in order to guarantee a level of voice quality.

The collocated Bluetooth transceiver is assumed to be Bluetooth version 2.0+Enhanced Data Rate (EDR). The ability to use all of the capabilities of the advanced Bluetooth standard depends on the support provided from the remote device connected to the Bluetooth transceiver. The ability to implement the coexistence mechanisms of the present invention is determined by whether Bluetooth devices such as headsets support advanced capabilities.

The following three options for voice scheduling is referred to throughout this document:

C1: Bluetooth 1.1 system without eSCO; voice traffic uses SCO HV3 with no retries;

C2: Bluetooth 1.2+Hands Free Protocol (HFP) 1.5 systems with eSCO operating in EV3 with periodicity of six slots;

C3: Bluetooth 1.2+HFP 1.5 systems with eSCO operating with flexible packet type and periodicity;

In addition, a Bluetooth handset may operate as a master or as a slave on the communication link with the headset. This determines whether the handset controls the system clock or if it synchronizes to the remote headset. The standard operation of a headset is usually based on the headset being the master. The handset can, however, switch the roles of master and slave through negotiation with the headset. In this case, there are two scenarios to analyze:

D1: The headset operates as a slave or supports master/slave role switching;

D2: The headset operates as a master and does not support role switching;

The operation of the coexistence mechanism with all of the above options and conditions is described infra.

As shown in FIG. 3, the coexistence mechanism utilizes a single antenna 132 configuration. The WiMAX and Bluetooth transceivers are connected to the antenna through an antenna switch 134 comprising three positions for WiMAX transmitter, WiMAX receiver and Bluetooth transceiver. The isolation provided by the switch between the Bluetooth and WiMAX terminals is preferably greater than 25 dB.

In general, the coexistence mechanism of the present invention utilizes multiple algorithms depending on the capabilities of the Bluetooth peer and the power save support level of the WiMAX base station. In the example embodiment presented herein, the coexistence mechanism is implemented in the MAC layer of the Bluetooth and WiMAX radio modules.

The Bluetooth transceiver tine base is synchronized to WiMAX frames. Bluetooth ACL transmissions are preempted whenever the WiMAX radio is operating in either receive or transmit. When a Bluetooth eSCO link is set up, the WiMAX radio switches to power save mode and the listen and sleep periods are adjusted accordingly. Bluetooth transmission slots are initially scheduled such that they do not overlap WiMAX listen windows. Synchronization between the Bluetooth and WiMAX radio modules is maintained by applying corrections to the Bluetooth clock based on the start of frames indication signals generated by the WiMAX transceiver.

Bluetooth/WiMAX Coexistence Method #1

B1

Figure 7:
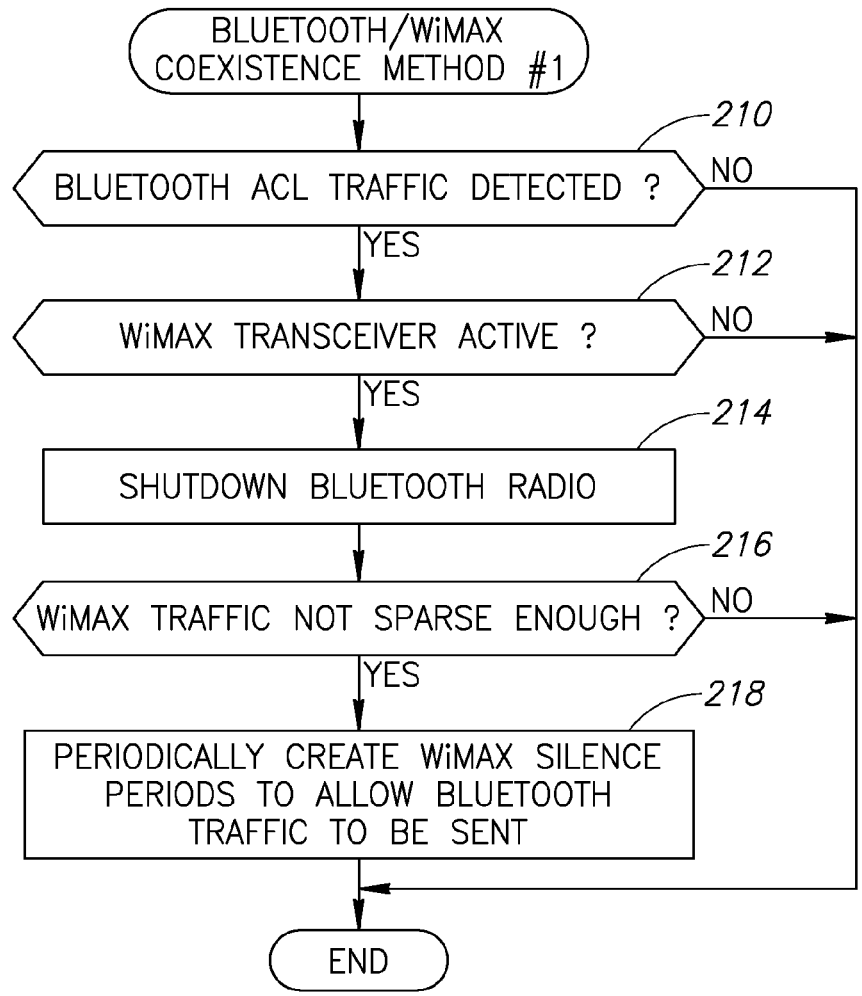
FIG. 7 is a flow diagram illustrating a first Bluetooth/WiMAX coexistence method of the invention.

A flow diagram illustrating a first Bluetooth/WiMAX coexistence method of the invention is shown in FIG. 7. Method #1 is suitable in the case of B1 type Bluetooth traffic, i.e. asynchronous connectionless link (ACL) traffic used to carry non-latency sensitive data services such as file transfer, printing, etc. For Bluetooth ACL traffic the coexistence mechanism is operative to block the Bluetooth transceiver from operating during the active periods of the WiMAX transceiver. Thus, if Bluetooth ACL traffic is detected (step 210) and the WiMAX transceiver is active (i.e. transmitting, receiving) (step 212), then the Bluetooth transceiver is shutdown (step 214), thus preventing transmission or reception. To achieve this, the WiMAX transceiver generates a signal that is output to the Bluetooth transceiver. In response to the signal, the Bluetooth receiver shuts down its transceiver circuit. The WiMAX transceiver generates the signal whenever it is receiving a frame header and MAP and in all receive and transmit slots associated with it.

Note that Bluetooth operation is maintained due to ACL retransmissions and the low duty cycle of WiMAX per single mobile device, which is assumed. If the WiMAX traffic is sufficiently sparse, the above scheme should provide the Bluetooth transceiver with enough transmission opportunities to deliver reasonable throughput and service. In the event the WiMAX traffic is not sufficiently sparse (step 216), the mechanism periodically creates WiMAX silence periods to allow for the Bluetooth traffic to pass (step 218). These silence periods should be enough to allow the largest Bluetooth exchange to pass (i.e. 6 Bluetooth slots=3.75 msec). This may be achieved by putting the WiMAX transceiver into power save mode. The required effect can be achieved for both Power Save Type 1 and 3, with Type 3 being preferable.

Bluetooth/WiMAX Coexistence Method #2

B2 & C3 & D1 & A2

Figure 8:
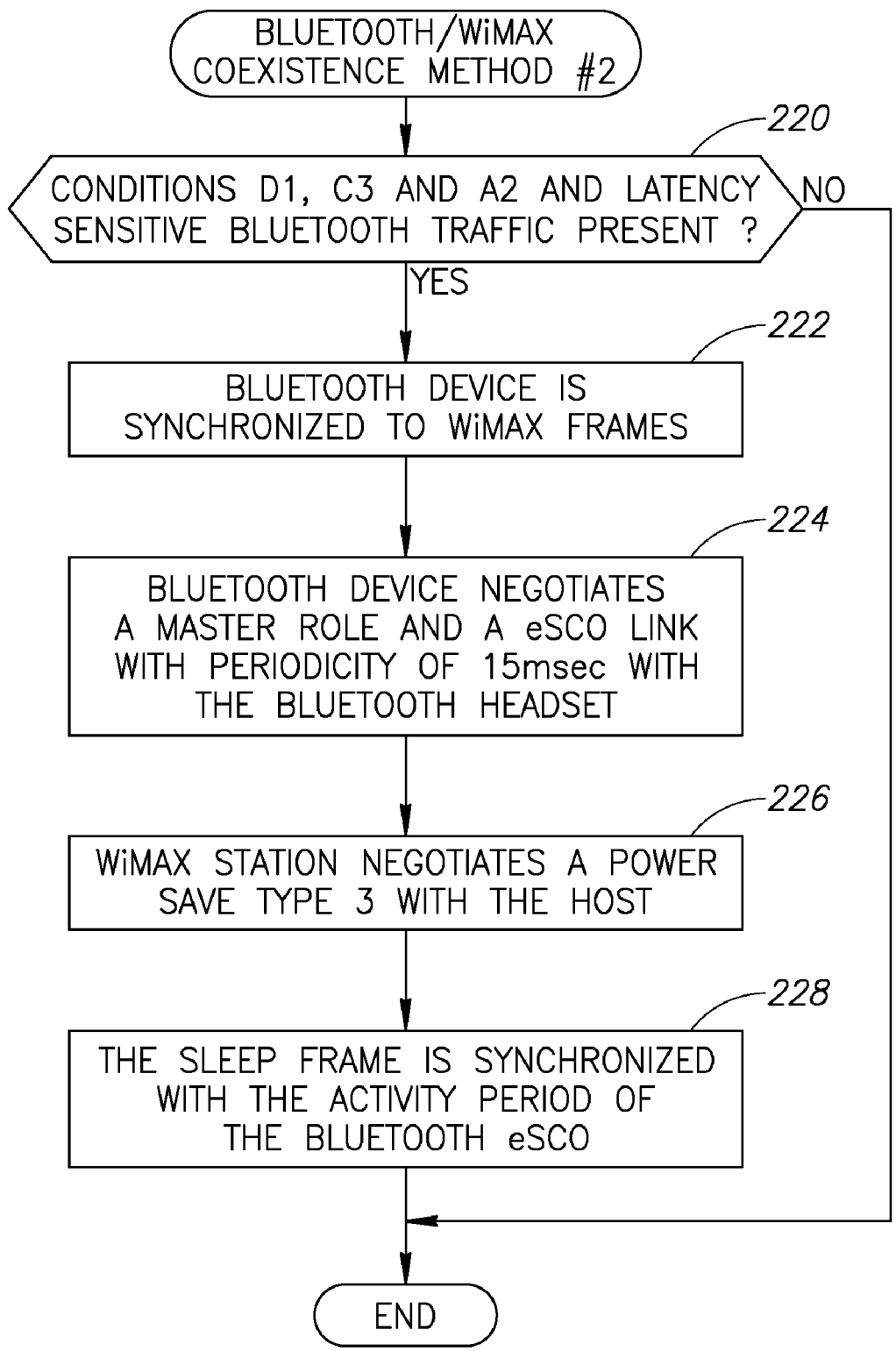
FIG. 8 is a flow diagram illustrating a second Bluetooth/WiMAX coexistence method of the invention.

A flow diagram illustrating a second Bluetooth/WiMAX coexistence method of the invention is shown in FIG. 8. Method #2 is suitable when conditions B2 & C3 & D1 & A2 are met. If conditions D1 & C3 & A2 are fulfilled (step 220) then the following coexistence solution can be used for B2 type Bluetooth traffic (e.g., voice data).

The Bluetooth device is synchronized to WiMAX frames (step 222). The WiMAX transceiver is operative to generate a synchronization signal that is input to the Bluetooth transceiver. The Bluetooth device negotiates a master role with the device at the other end of the Bluetooth link (e.g., the headset) and also negotiates an eSCO link of periodicity of 15 msec with the headset (step 224). The WiMAX transceiver negotiates a Power Save Type 3 mode with the host with a period of two frames awake and one frame in sleep (step 226). The sleep frame is synced with the activity period of the Bluetooth eSCO link (step 228). Note that the current WiMAX specification requires a minimum of two awake slots since upstream MAP is provided for the next frame and not the current frame.

Figure 9:
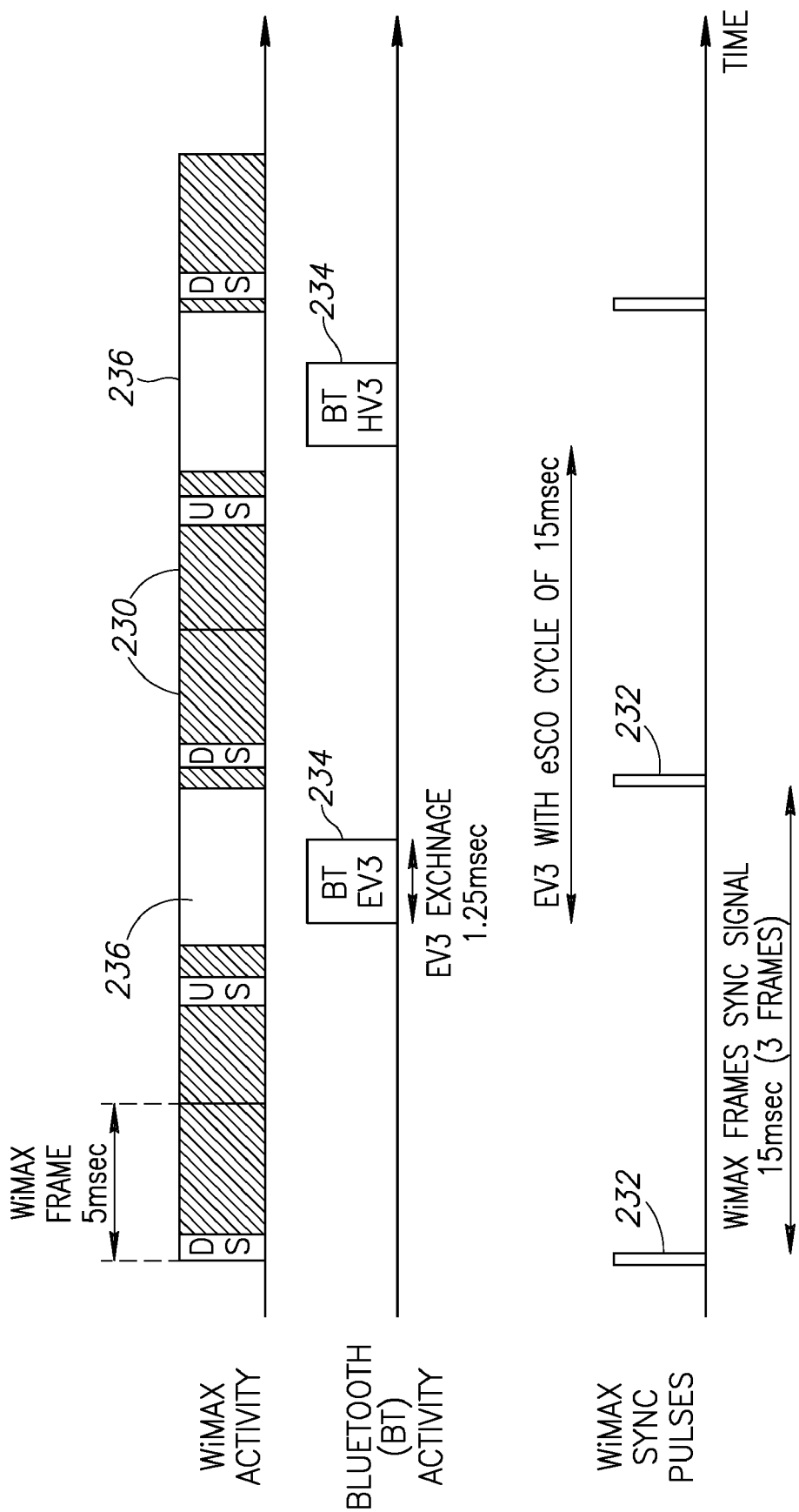
FIG. 9 is a diagram illustrating timing relationship between Bluetooth and WiMAX activity.

A diagram illustrating timing relationship between Bluetooth and WiMAX activity is shown in FIG. 9. The WiMAX active frames 230 (5 msec wide) are shown in cross hatching, while the WiMAX sleep frames 236 are shown with no cross-hatching. Both transceivers are configured such that Bluetooth activity 234 occurs while the WiMAX transceiver is in a sleep frame. Bluetooth activity is synchronized to the WiMAX sync pulses 232.

Bluetooth/WiMAX Coexistence Method #3

B2 & C2 & D1 & A2

Figure 10:
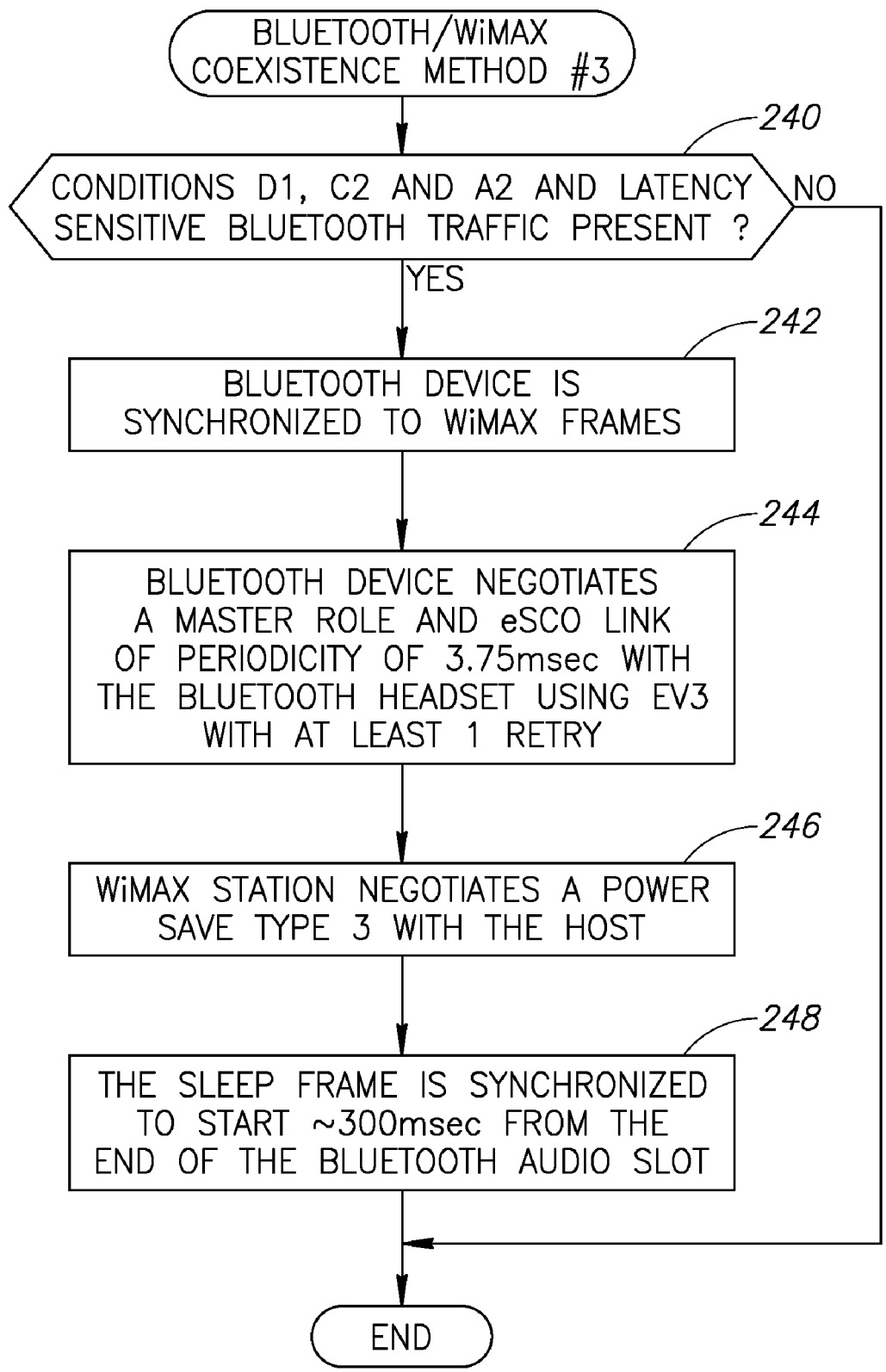
FIG. 10 is a flow diagram illustrating a third Bluetooth/WiMAX coexistence method of the invention.

A flow diagram illustrating a third Bluetooth/WiMAX coexistence method of the invention is shown in FIG. 10. Method #3 is suitable when conditions B2 & C2 & D1 & A2 are met. If conditions D1 & C2 & A2 are met (step 240) and latency sensitive Bluetooth traffic is to be transmitted, then the following coexistence solution can be used for B2 type Bluetooth traffic (e.g., voice data).

The Bluetooth device is synchronized to WiMAX frames (step 242). The WiMAX transceiver is operative to generate a synchronization signal that is input to the Bluetooth transceiver. The Bluetooth device negotiates a master role with the device at the other end of the Bluetooth link (e.g., the headset) and also negotiates an eSCO link of periodicity of 3.75 msec with the headset using EV3 with at least one retry (step 224). The WiMAX station negotiates a Power Save Type 3 with the host with a period of two frames awake and one frame in sleep (step 246). The sleep frame is synced such that it starts approximately 300 us from the end of the Bluetooth audio slot (step 248). The coexistence mechanism timing guarantees that the WiMAX transceiver will need to blank only one of the audio transactions in order to allow WiMAX reception and transmission during its active period.

Thus, as a first option, when a Bluetooth SCO/eSCO link is setup, the WiMAX transceiver switches to power save mode. If the base station capabilities permit (i.e. power save state and WiMAX frame size), the WiMAX listen period and sleep window are selected to be a multiple of the basic eSCO period with the listen period being smaller than the non-active period of the eSCO link. The Bluetooth transceiver attempts to establish eSCO periods that are a multiple of the WiMAX frame size.

If the base station does not have sufficient capabilities but the eSCO link provides for retransmissions, as a second option, the WiMAX transceiver selects a listen period and sleep window such that at least one of the retransmission attempts for each Bluetooth eSCO burst does not overlap the WiMAX listen window.

If either of the first or second options are used, the Bluetooth SCO/eSCO transmission slots are initially scheduled such that they do not overlap WiMAX listen windows. Otherwise, the Bluetooth transceiver is blocked or shutdown resulting in a degradation of its QoS.

Note also that synchronization between the Bluetooth and WiMAX transceivers is maintained by applying corrections to the Bluetooth clock based on the start of frame indication signal from the WiMAX transceiver. The Bluetooth transceiver operates as a master and will initiate a role switch if it was setup as a slave during link initiation.

Bluetooth/WiMAX Coexistence Method #4

B2 & (C2|C3)

Figure 11:
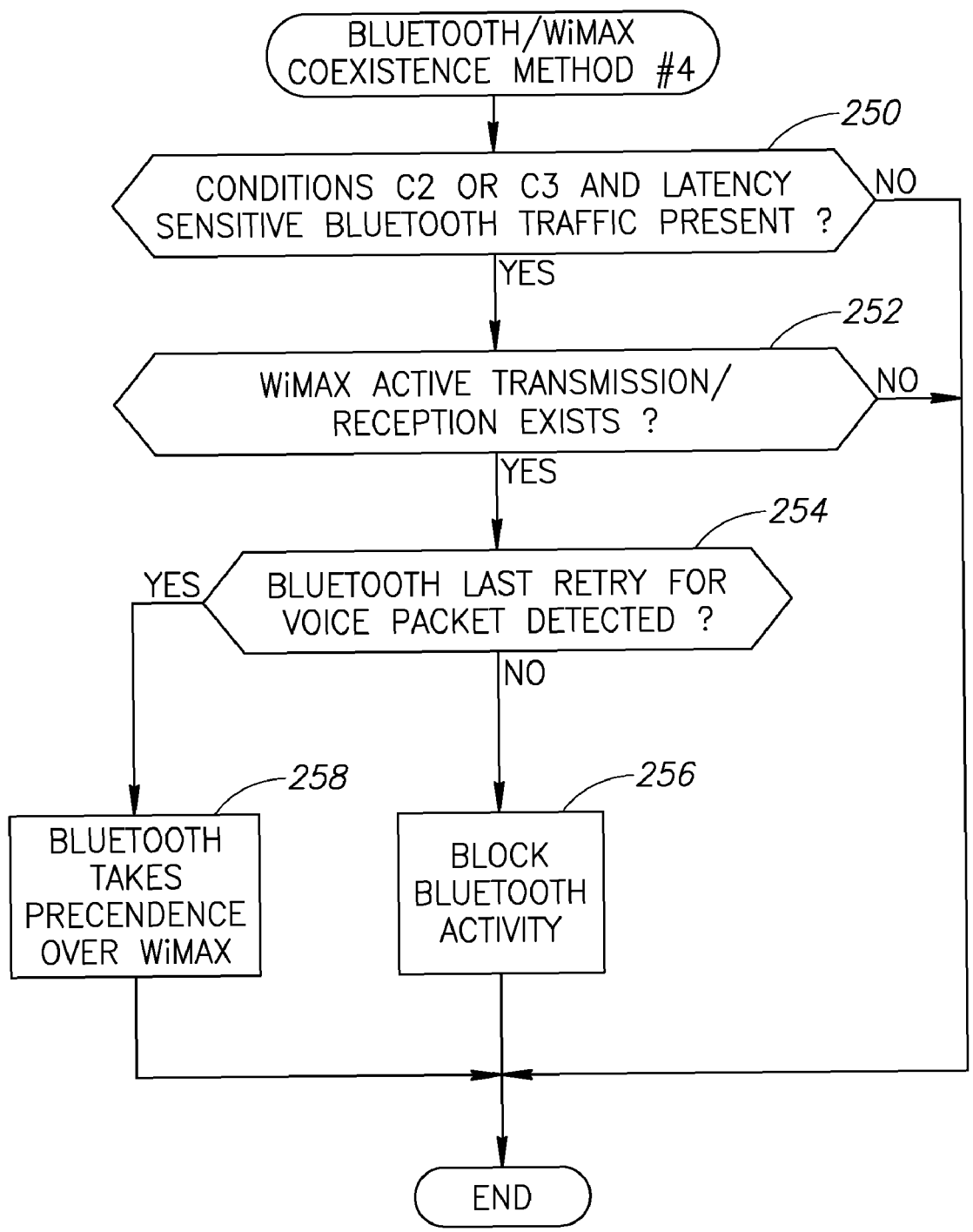
FIG. 11 is a flow diagram illustrating a fourth Bluetooth/WiMAX coexistence method of the invention.

A flow diagram illustrating a fourth Bluetooth/WiMAX coexistence method of the invention is shown in FIG. 11. If conditions C2 or C3 are met (step 250), then the following coexistence solution can be used for B2 Bluetooth traffic (e.g., voice data) for all D & A options (i.e. D1, D2, A1 and A2).

If a WiMAX active reception/transmission exists (step 252), it is then checked whether the Bluetooth transmission is a last retry for a latency sensitive packet such as voice (step 254). If the Bluetooth transmission is not a last retry packet, then the Bluetooth transmission is blocked (step 256). If, however, the Bluetooth transmission is a last retry packet, then this case is treated as an exception and the Bluetooth transmission takes precedence over the WiMAX transmit/receive activity (step 258). This ensures that the Bluetooth voice quality is maintained with the consequence that the WiMAX bandwidth may suffer some degradation. Note that the larger the number of retries configured for the Bluetooth transceiver, however, the lower the wasted bandwidth on the Bluetooth side.

Bluetooth/WiMAX Coexistence Method #5

B2 & C1

Figure 12:
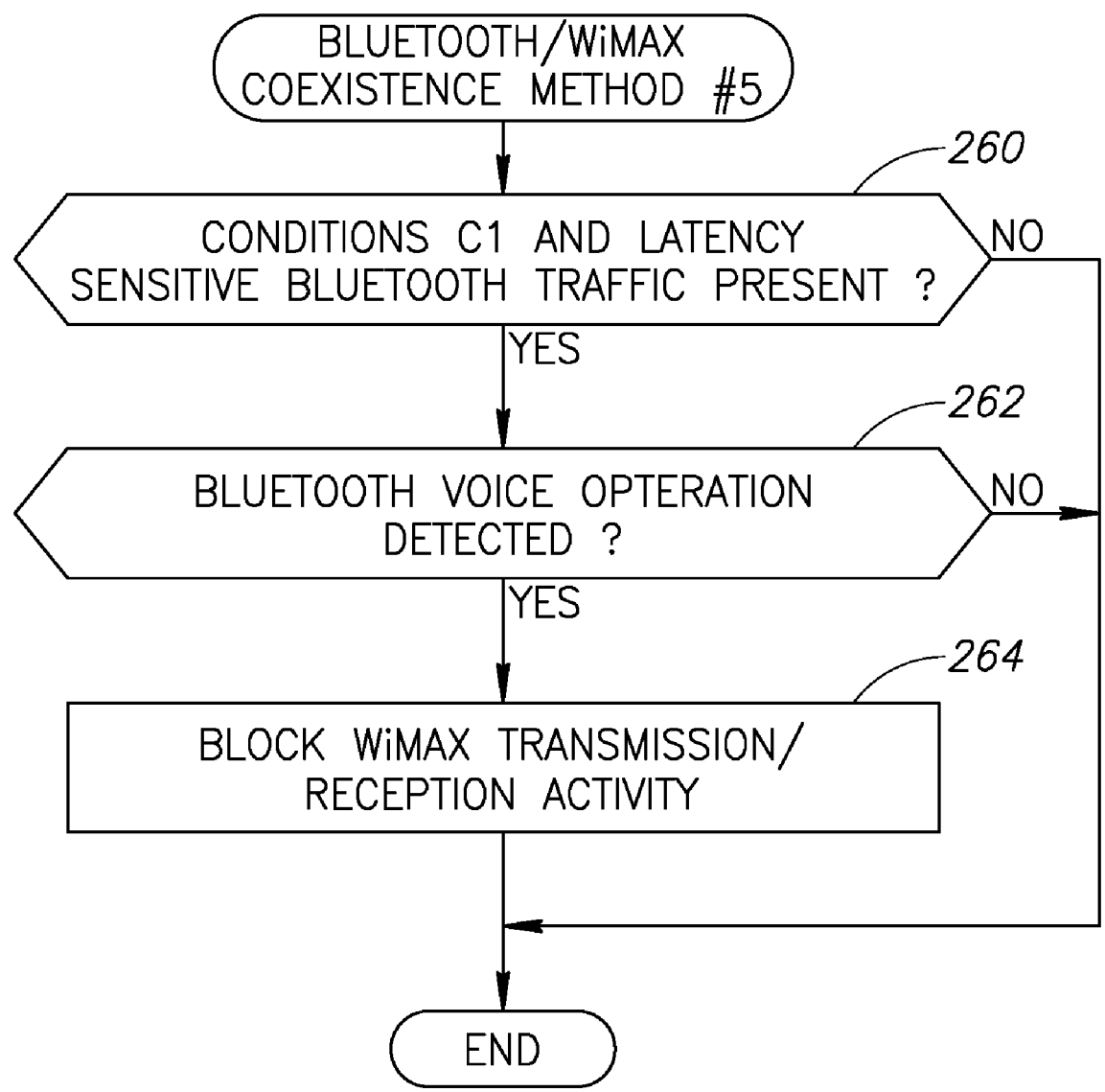
FIG. 12 is a flow diagram illustrating a fifth Bluetooth/WiMAX coexistence method of the invention.

A flow diagram illustrating a fifth Bluetooth/WiMAX coexistence method of the invention is shown in FIG. 12. If conditions C1 is met (step 250), then the following coexistence solution can be used for B2 Bluetooth traffic (e.g., voice data). Note that the solution provided by the coexistence mechanism may not be sufficient depending on the particular implementation and system requirements.

In the case that Bluetooth voice operation is detected (i.e. latency sensitive services traffic such as voice) (step 262), the coexistence mechanism is operative to block WiMAX transmit/receive activity during Bluetooth B2 type transmissions (step 264). Note, however, for HV3 or EV3 with period six, the WiMAX operation may be significantly effected resulting in increased bandwidth requirements for the mobile station.

Summary of Coexistence Methods

The following Table 1 below summarizes the different algorithmic options and their usage that are part of the coexistence mechanism. Regarding the quality of the algorithms presented in each of the five methods in terms of its effect on WiMAX wasted bandwidth, methods #1, #2 and #3 are superior to methods #4 and #5. Note that within each method, a tradeoff exists between the degree of WiMAX wasted bandwidth versus the degree of degradation of the Bluetooth voice quality, with each able to be traded off for the other.

TABLE 1

Summary of Coexistence Methods

| | B1 | A1 & B2 | A2 & B2 |
|---|---|---|---|
| C1 & D1 | Method #1 | Method #5 | Method #5 |
| C1 & D2 | Method #1 | Method #5 | Method #5 |
| C2 & D1 | Method #1 | Method #4 | Method #3 |
| C2 & D2 | Method #1 | Method #4 | Method #4 |
| C3 & D1 | Method #1 | Method #4 | Method #2 |
| C3 & D2 | Method #1 | Method #4 | Method #4 |

Note also that an implementation of the coexistence mechanism can use all or a combination of the above methods and techniques wherein a specific method, technique or algorithm may be used in accordance with the supported features and traffic types of the particular system.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A mobile communications device, comprising:
   a Bluetooth transceiver and associated Bluetooth media access control (MAC);
   a WiMAX transceiver and associated WiMAX MAC;
   coexistence means coupled to said Bluetooth transceiver and said WiMAX transceiver, said coexistence means operative to;
   synchronize the time base of said Bluetooth transceiver to WiMAX frames;
   block Bluetooth ACL transmissions during WiMAX transmit/receive activity;
   switch said WiMAX transceiver to power save mode in response to Bluetooth SCO link setup and to select a listen period and sleep window to be a multiple a basic SCO period;
   schedule Bluetooth SCO slots such that they do not overlap with WiMAX listen windows; and
   a processor operative to send and receive data to and from said Bluetooth transceiver and said WiMAX transceiver.

2. The mobile communications device according to claim 1, further comprising the step of maintaining synchronization by corrections of a Bluetooth transceiver clock based on a start of frame indication signal generating by said WiMAX transceiver.

3. The mobile communications device according to claim 1, wherein said SCO link comprises latency sensitive voice traffic.

4. The mobile communications device according to claim 1, wherein said Bluetooth transceiver is synchronized via a synchronization signal generated by said WiMAX transceiver.

5. The mobile communications device according to claim 1, wherein said Bluetooth transceiver is operative to act as a master.

6. The mobile communications device according to claim 1, wherein said Bluetooth transceiver is operative to initiate a role switch if it was setup as a slave device during link setup.

* * * * *